US008558022B2

(12) United States Patent
Vinci et al.

(10) Patent No.: US 8,558,022 B2
(45) Date of Patent: Oct. 15, 2013

(54) OLIGOMERIZED ESTER ALKOXYLATE COMPOSITIONS

(75) Inventors: Daniele Vinci, Gent (BE); Jochem Kersbulck, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 307 days.

(21) Appl. No.: 13/081,599

(22) Filed: Apr. 7, 2011

(65) Prior Publication Data

US 2011/0269980 A1 Nov. 3, 2011

Related U.S. Application Data

(60) Provisional application No. 61/329,398, filed on Apr. 29, 2010.

(51) Int. Cl.
*C07C 59/01* (2006.01)

(52) U.S. Cl.
USPC ............ 554/213; 554/169; 554/170; 554/174

(58) Field of Classification Search
USPC .................................. 554/170, 213, 169, 174
See application file for complete search history.

(56) References Cited

U.S. PATENT DOCUMENTS

| | | | |
|---|---|---|---|
| 2,396,994 A | 3/1946 | Filachione et al. | |
| 2,534,255 A | 1/1952 | Patton et al. | |
| 2,580,460 A | 1/1952 | Patton et al. | |
| 2,652,410 A | 9/1953 | Cunningham et al. | |
| 2,721,188 A | 10/1955 | Polly et al. | |
| 3,278,459 A | 10/1966 | Herold | |
| 3,427,256 A | 2/1969 | Milgrom | |
| 3,427,334 A | 2/1969 | Belner | |
| 3,941,849 A | 3/1976 | Herold | |
| 4,428,850 A | 1/1984 | Zoleski et al. | |
| 4,477,589 A | 10/1984 | Van der Hulst et al. | |
| 4,684,473 A | 8/1987 | Bock et al. | |
| 4,699,998 A | 10/1987 | Green | |
| 5,011,629 A | 4/1991 | Bilbo | |
| 5,158,922 A | 10/1992 | Hinney et al. | |
| 5,237,080 A | 8/1993 | Daute et al. | |
| 5,374,366 A | 12/1994 | Nakahara et al. | |
| 5,380,894 A | 1/1995 | Burg et al. | |
| 5,420,315 A | 5/1995 | Uhrig et al. | |
| 5,427,704 A | 6/1995 | Lawate | |
| 5,442,082 A | 8/1995 | Uphues et al. | |
| 5,451,332 A | 9/1995 | Lawate | |
| 5,458,795 A | 10/1995 | Lawate | |
| 5,470,813 A | 11/1995 | Le-Khac | |
| 5,482,908 A | 1/1996 | Le-Khac | |
| 5,731,407 A | 3/1998 | Le-Khac | |
| 5,856,413 A | 1/1999 | Charles et al. | |
| 6,018,063 A | 1/2000 | Isbell et al. | |
| 6,201,144 B1 | 3/2001 | Isbell et al. | |
| 6,316,649 B1 | 11/2001 | Cermak et al. | |
| 6,362,265 B1 | 3/2002 | Wo et al. | |
| 6,407,272 B1 | 6/2002 | Nelson et al. | |
| 6,429,324 B1 | 8/2002 | Raths et al. | |
| 7,348,460 B2 | 3/2008 | Wulff et al. | |
| 2002/0017629 A1 | 2/2002 | Mosier et al. | |
| 2005/0014908 A1 | 1/2005 | Kutsuna et al. | |
| 2007/0123725 A1 | 5/2007 | Lorenz | |
| 2008/0125569 A1* | 5/2008 | Wehmeyer et al. ........... 528/361 |
| 2008/0175931 A1 | 7/2008 | Schlemer et al. | |
| 2011/0213170 A1 | 9/2011 | Vinci et al. | |
| 2011/0269980 A1 | 11/2011 | Vinci et al. | |
| 2012/0136168 A1 | 5/2012 | Kersbulck et al. | |

FOREIGN PATENT DOCUMENTS

| | | |
|---|---|---|
| EP | 1712576 A1 | 10/2006 |
| EP | 1842866 A1 | 10/2007 |
| FR | 2290414 B1 | 3/1977 |
| FR | 2374290 B1 | 9/1980 |
| JP | 5163342 | 6/1993 |
| JP | 7228881 | 8/1995 |
| JP | 8027473 | 1/1996 |
| JP | 10036870 | 2/1998 |
| WO | 01/53247 A1 | 7/2001 |
| WO | 2006047436 A1 | 5/2006 |
| WO | 2008/040864 A1 | 4/2008 |
| WO | 2008124265 A2 | 10/2008 |
| WO | 2009/139003 A1 | 11/2009 |
| WO | 2011/005635 A1 | 1/2011 |
| WO | 2011/037778 A1 | 3/2011 |
| WO | 2011/106186 A1 | 9/2011 |
| WO | 2013/002910 A1 | 1/2013 |

OTHER PUBLICATIONS

International Search Report and Written Opinion for PCT/US2011/031497 dated Aug. 9, 2011.

Sharma et al., "Chemical Modification of Vegetable Oils for Lubricant Applications", Journal of the American Oil Chemists' Society, 2006, vol. 83, No. 2, pp. 129-136.

Cermak et al., "Synthesis and physical properties of mono-estolides with varying chain lengths", Industrial Crops and Products, 2009, vol. 29, No. 1, pp. 205-213, Elsevier.

Cermak et al., "Synthesis and Physical Properties of Tallow-Oleic Estolide 2-Ethylhexyl Esters", Journal of the American Oil Chemists' Society, 2007, vol. 84, pp. 449-456.

Cermak et al., "Synthesis and Physical Properties of Estolides from Lesquerella and Castor Fatty Acid Esters", Industrial Crops and Products, 2006, vol. 23, No. 1, pp. 54-64, Elsevier.

(Continued)

*Primary Examiner* — Yate K Cutliff
(74) *Attorney, Agent, or Firm* — Steven W. Mork

(57) ABSTRACT

A process results in oligomerized ester alkoxylate compositions having substantially no unsaturation, which may be useful as lubricants, heat transfer fluids, plasticizers, thickening agents, surfactants, or power transmission fluids. The steps include, in either order, oligomerization of a hydroxylated fatty acid or fatty ester and quantitative reaction of unreacted carboxylic acid or ester groups with an alcohol, with the product of either reaction then being alkoxylated in the presence of a double metal cyanide catalyst. These oligomerized ester alkoxylates may be derived from vegetable oils to ensure high levels of renewable carbons. The compositions may exhibit desirably high viscosity index, low pour point, and high levels of renewable carbons.

8 Claims, No Drawings

(56) References Cited

OTHER PUBLICATIONS

Frankel et al., "Oxidative acetoxylation of methyl oleate with palladium catalysts", Journal of Organic Chemistry, 1975, vol. 40, No. 22, pp. 3247-3253.

Gunstone et al., "Fatty Acids, Part 37—Application of the Oxymercuration-demercuration reaction to long-chain unsaturated esters", Chemistry and Physics of Lipids, 1973, vol. 10, No. 1, pp. 73-88.

Previtera et al., "Fatty Acid Composition in Lemna Minor-Characterization of a Novel Hydroxy C16 Acid", Phytochemistry, 1983, vol. 22, No. 6, pp. 1445-1446, Pergamon Press.

Swern et al., "Viscosity Characteristics of Esters of Hydroxystearic Acids", Journal of Chemical and Engineering Data, 1960, pp. 231-233.

International Search Report and Written Opinion for PCT/US2011/024702 dated May 17, 2011.

International Search Report and Written Opinion for PCT/US2010/040703 dated Sep. 21, 2010.

International Search Report and Written Opinion for PCT/US2012/038565 dated Aug. 3, 2012.

* cited by examiner

OLIGOMERIZED ESTER ALKOXYLATE COMPOSITIONS

CROSS-REFERENCE TO RELATED APPLICATIONS

This application claims priority from U.S. provisional application Ser. No. 61/329,398, filed Apr. 29, 2010, which is incorporated herein by reference in its entirety.

BACKGROUND

1. Field of the Invention

This invention relates to the field of production of ester alkoxylates. More particularly, it relates to compositions and processes for preparing ester alkoxylates having high levels of renewable carbons.

2. Background of the Art

The lubricants (engine and non-engine) and process fluids industries today are searching for materials that are biodegradable. Biodegradability means that the lubricants and process fluids (hereinafter "fluids") degrade over a period of time, which may be measured by tests such as those promulgated by the Organization of Economic Co-Operation and Development (OECD), including OECD 301B and OECD 301F. Recently, interest has been increasing in fluids which are not only biodegradable, but also renewable. Renewable products contain, by definition, high levels of renewable carbons, and standards are being set to encourage increasingly greater levels of renewability. For example, the European Ecolabel now requires that hydraulic fluids must contain at least 50 percent by weight renewable carbons. Standards for determining levels of renewable carbons may be found in, for example, American Standards for Testing Materials (ASTM) D6866-08.

Researchers have attempted to meet requirements or recommendations for both biodegradability and renewability by including in their fluids formulations a variety of types of natural and synthesized oils. Unfortunately, many of these materials exhibit pour points that are too high to enable use in certain important applications. The pour point is the lowest temperature at which the fluid will flow, and pour points below 0 degrees Celsius (° C.), desirably below −10° C., more desirably below −15° C., and even below −25° C., are often necessary. These materials in many cases also suffer from poor thermo-oxidative stability at high temperatures (for example, above 90° C.), which may in some cases be due to the amount of unsaturation present in the acid fraction of their chemical structures. Desirable measurements of other properties, including but not limited to viscosity index, elastomer compatibility, lubricity, hydrolytic stability, and/or oil solubility, may also be difficult to achieve.

Thus, there is a need in the art for new compositions exhibiting improvements in some or all of the above properties, such that they are capable of performing acceptably in lubricant and a variety of other applications.

SUMMARY OF THE INVENTION

In one embodiment the invention provides a process to prepare an oligomerized ester alkoxylate comprising reacting an oligomerized ester of a hydroxylated fatty acid, or of a hydroxylated fatty ester, with an alkylene oxide, in the presence of a double metal cyanide catalyst, under conditions such that an oligomerized ester alkoxylate having substantially no unsaturation is formed, the oligomerized ester having been prepared by either (a) partially oligomerizing a hydroxylated fatty acid containing at least one carboxylic acid group, or a hydroxylated fatty ester containing at least one ester group, such that less than 99 mole percent of the carboxylic acid groups or ester groups is reacted to form a product including an oligomer of the hydroxylated fatty acid or the hydroxylated fatty ester having residual unreacted carboxylic acid groups or ester groups; and quantitatively reacting the unreacted carboxylic acid groups or ester groups with an alcohol having from 2 to 22 carbon atoms; optionally removing any excess alcohol; to form a product further including an oligomerized ester of the hydroxylated fatty acid or of the hydroxylated fatty ester; or (b) quantitatively reacting a hydroxylated fatty acid containing at least one carboxylic acid group, or a hydroxylated fatty ester containing at least one ester group, with an alcohol having from 2 to 22 carbon atoms; optionally removing any excess alcohol; to form a product including an ester of the hydroxylated fatty acid or of the hydroxylated fatty ester; and partially oligomerizing the ester of the hydroxylated fatty acid or of the hydroxylated fatty ester such that less than 99 molar percent of the carboxylic acid groups or ester groups is reacted to form a product including an oligomerized ester of the hydroxylated fatty acid or of the hydroxylated fatty ester.

In another embodiment the invention provides an oligomerized ester alkoxylate composition prepared by a process comprising reacting an oligomerized ester of a hydroxylated fatty acid, or of a hydroxylated fatty ester, with an alkylene oxide, in the presence of a double metal cyanide catalyst, under conditions such that an oligomerized ester alkoxylate having substantially no unsaturation is formed, the oligomerized ester having been prepared by either (a) partially oligomerizing a hydroxylated fatty acid containing at least one carboxylic acid group, or a hydroxylated fatty ester containing at least one ester group, such that less than 99 mole percent of the carboxylic acid groups or ester groups is reacted to form a product including an oligomer of the hydroxylated fatty acid or the hydroxylated fatty ester having residual unreacted carboxylic acid groups or ester groups; and quantitatively reacting the residual unreacted carboxylic acid groups or ester groups with an alcohol having from 2 to 22 carbon atoms; optionally removing any excess alcohol; to form a product further including an oligomerized ester of the hydroxylated fatty acid or of the hydroxylated fatty ester; or (b) quantitatively reacting a hydroxylated fatty acid containing at least one carboxylic acid group, or a hydroxylated fatty ester containing at least one ester group, with an alcohol having from 2 to 22 carbon atoms; optionally removing any excess alcohol; to form a product including an ester of the hydroxylated fatty acid or of the hydroxylated fatty ester; and partially oligomerizing the ester of the hydroxylated fatty acid or of the hydroxylated fatty ester such that less than 99 mole percent of the carboxylic acid groups or ester groups is reacted to form a product including an oligomerized ester of the hydroxylated fatty acid or of the hydroxylated fatty ester.

DETAILED DESCRIPTION OF THE EMBODIMENTS

The invention provides a process, with certain variations, that may be employed to prepare oligomerized ester alkoxylate compositions beginning with either a petrochemical or renewable source. In certain desirable embodiments, a renewable carbon resource may be used, thereby assisting to ensure that the final oligomerized ester alkoxylate compositions contain a desirable or specified level of renewable carbon content. Use of the inventive process helps to reduce or eliminate unsaturation in the final compositions, therefore contributing to properties improvements that are discussed in greater detail hereinbelow, and that are desirable for, in particular and non-limiting embodiments, use of the oligomerized ester alkoxylate compositions in lubricant applications.

To begin preparing the oligomerized ester alkoxylates according to the invention, a starting material is selected from among hydroxylated fatty acids or their corresponding hydroxylated fatty esters. These fatty acids or fatty esters preferably have carbon atom numbers ranging, in particular embodiments, from 14 to 23. Particularly useful are 12-hydroxy stearic acid and 12-hydroxy stearic acid methyl ester (also called methyl-12-hydroxy-stearate, or methyl 12-HSA), which may be obtained from sources including, but not limited to, castor oil, cottonseed oil, or ergot. In certain embodiments, castor oil is preferred as a convenient and economical source.

In one embodiment of the invention the selected fatty acid or fatty ester is first partially oligomerized. This may be carried out using any suitable means and process. The goal of this first step is to produce oligomers having a degree of oligomerization from 1.01 to 100, preferably from 1.11 to 10, and more preferably from 1.25 to 5. The oligomerization is desirably a partial oligomerization, such that some proportion of unreacted fatty acid groups, i.e., carboxylic acid groups, or fatty ester groups remains. In certain embodiments that remaining proportion may be up to 99 mole percent (mol %), that is, a minimum of 1 mol % of the selected fatty acid or fatty ester groups is oligomerized. In preferred embodiments, however, it is desirable that the unreacted portion range from 10 to 90 mol %, and in more preferred embodiments the unreacted portion may range from 20 to 80 mol %, the remainder being the oligomerized content.

A catalyst may optionally be used to facilitate this oligomerization. Suitable catalysts may include, but are not limited to, organic catalysts containing tin, titanium, or nitrogen. Such catalysts may include, in non-limiting example, tin(II)-2-ethylhexanoate, tin oxide, tin dichloride, dibutyltin(II)-2-ethylhexanoate, and combinations thereof.

Conditions for the oligomerization may desirably include heating at a temperature ranging from 70 to 220° C., and preferably from 180 to 210° C. Time may range from 1 hour (h) to 24 h. Methanol or water formed as a result of the reaction may be concurrently removed. In one embodiment this removal may be accomplished by azeotropic distillation using, for example, nonane as an entrainer, with any remaining nonane then itself removed by distillation. The entrainer level may be up to 20 percent by weight (wt %), with a level of 15 wt % being found to be very effective in some non-limiting embodiments.

In this first embodiment of the inventive process, step 2 is the transesterification of the product of step 1. This product contains both unreacted hydroxylated fatty acid, or its corresponding hydroxylated fatty ester, and the oligomerized fatty ester or fatty acid. The transesterification, i.e., esterification reaction, may be carried out by contacting the unreacted portion of the carboxylic acid groups or ester groups with an alcohol. In preferred embodiments such alcohol has from 2 to 22 carbon atoms. Suitable selections may include, in non-limiting example, ethanol, isopropanol, tert-butanol, 2-ethylhexanol, 2-octanol, diisobutyl carbinol, decanol, dodecanol, or a combination thereof. In more preferred embodiments, 2-ethylhexanol may be employed. It is particularly useful to use an amount of the alcohol ranging from 1 to 4 equivalents, based on the unreacted hydroxylated fatty acid or fatty ester's methyl functionality, with 2 equivalents being frequently preferred. Such amount helps to ensure a reaction between the alcohol and the unreacted hydroxylated fatty acid or hydroxylated fatty ester that has a conversion greater than 90 mole percent (mol %).

A catalyst may also optionally be used to facilitate this transesterification step. It may be most convenient to use the same catalyst as may be used for facilitating step 1 (partial oligomerization), without adding additional catalyst. However, additional and/or a different catalyst may be used for this second step. As with the oligomerization step, catalyst selections that may be suitable include, in non-limiting example, a variety of organic catalysts containing tin, titanium or nitrogen. Specific non-limiting examples may include tin(II) catalysts, such as tin(II)-2-ethylhexanoate, tin oxide, tin dichloride, dibutyltin(II)-2-ethylhexanoate, and combinations thereof.

Conditions for the transesterification step may include heating at temperatures ranging from 70 to 220° C., over time periods ranging from 1 to 24 h. Again, optional removal of formed methanol or water via azeotropic distillation, using nonane as an entrainer, may be particularly effective in driving the reaction toward completion. The catalyst may be used in an amount ranging from 0.05 and 1.00 mol %, preferably from 0.2 to 0.3 mol %, based on the reaction mixture.

Finally, step 3 in this embodiment is an alkoxylation step, wherein the remaining hydroxyl groups are quantitatively reacted with an alkylene oxide. Suitable alkylene oxides may include, in non-limiting example, ethylene oxide, propylene oxide, butylene oxide, and combinations thereof, with ethylene oxide, propylene oxide, and combinations of the two being preferred.

Conditions for step 3 may include a temperature ranging from 80 to 200° C.; times ranging from 0.5 to 24 h; and pressures ranging from 0.05 to 10 bar (5 kilopascals (kPa) to 1,000 kPa). In many embodiments the amount of the alkylene oxide may range from 1 to 200 equivalents, based on the residual hydroxyl functionality. In preferred embodiments the amount of alkylene oxide ranges from 3 to 25 equivalents.

A catalyst is particularly useful for this third step. Generally the amount of the catalyst may vary from 10 to 500 parts per million (ppm), with 15 to 30 ppm being frequently effective. This catalyst may be any that is suitable to facilitate the capping. Such may include, for example, a double metal cyanide complex catalyst, an acid catalyst, a base catalyst, an organometallic catalyst or a combination thereof. Double metal cyanide complex catalysts may be preferred, however, offering the surprising advantage in the inventive process of reducing and even eliminating formation of unwanted by-products and, in particular, reducing unsaturation.

Double metal cyanide complex compounds are well known as catalysts and have relatively high surface areas, typically within the range of from 50 to 200 square meters per gram ($m^2/g$). In some embodiments, the DMC catalyst may comprise a reaction product of a water-soluble metal salt and a water-soluble metal cyanide salt. A water-soluble metal salt may have the general formula

$$M(X) \quad \text{(Formula 1)}$$

in which M is a metal and X is an anion. M may be selected from zinc(II) [Zn(II)], iron(II) [Fe(II)], iron(III) [Fe(III)], nickel(II) [Ni(II)], manganese(II) [Mn(II)], cobalt(II) [Co(II)], tin(II) [Sn(II)], lead(II) [Pb(II)], molybdenum(IV) [Mo(IV)], molybdenum(VI) [Mo(VI)], aluminum(III) [Al(III)], vanadium(IV) [V(IV)], vanadium(V) [V(V)], strontium(II) [Sr(II)], tungsten(IV) [W(IV)], tungsten(VI) [W(VI)], copper (II) [Cu(II)], and chromium(III) [Cr(III)]. It may be desirable in some embodiments for M to be selected from Zn(II), Fe(II), Co(II), and Ni(II). X may be an anion selected from the group including halide, hydroxide, sulfate, carbonate, cyanide, oxalate, thiocyanate, isocyanate, isothiocyanate, carboxylate, and nitrate. The value of n may be from 1 to 3 and satisfy the valence state of M. Examples of a suitable metal salt may include, without limitation, zinc chloride, zinc bromide, zinc acetate, zinc acetonylacetonate, zinc benzoate, zinc nitrate, iron(II) sulfate, iron(II) bromide, cobalt(II) chloride, cobalt (II) thiocyanate, nickel(II) formate, nickel(II) nitrate, and combinations thereof.

A water-soluble metal cyanide salt may have the general formula $$(Y)_a M'(CN)_b (A) \quad \text{(Formula 2)}$$

in which M' may be selected from Fe(II), Fe(III), Co(II), cobalt(III) [Co(III)], chromium(II) [Cr(II)], Cr(III), Mn(II), manganese(III) [Mn(III)], iridium(III) [Ir(III)], Ni(II), rhodium(III) [Rh(III)], ruthenium(II) [Ru(II)], V(IV), V(V), and combinations thereof, and CN is cyanide. It may be desirable in some embodiments for M' to be selected from Co(II), Co(III), Fe(II), Fe(III), Cr(III), Ir(III), Ni(II), and combinations thereof. It may also be desirable that Y be an alkali metal ion or alkaline earth metal ion, while A may be an ion selected from the group consisting of halide, hydroxide, sulfate, carbonate, cyanide, oxalate, thiocyanate, isocyanate, isothiocyanate, carboxylate, and nitrate. Both a and b are integers equal to or greater than 1. In addition, the sum of the charges of a, b, and c balances the charge of M'. Non-limiting examples of a suitable metal cyanide salt may include potassium hexacyanocobaltate(III), potassium hexacyanoferrate(II), potassium hexacyanoferrate(III), calcium hexacyanocobaltate(III), lithium hexacyano-cobaltate(III), and combinations thereof.

A solid DMC catalyst that is useful for the inventive process may include an organic complexing agent, often of a relatively low molecular weight and often containing a heteroatom. In some non-limiting embodiments it may be desirable or necessary for a complexing agent to be soluble in water. The complexing agent may be added during preparation and/or immediately following precipitation of the catalyst, and is frequently employed in excess. Examples of some suitable complexing agents are described in greater detail in U.S. Pat. Nos. 5,158,922; 3,427,256; 3,427,334; and 3,278,459; which are incorporated herein by reference in their entireties. Such complexing agents may include alcohols, aldehydes, ketones, ethers, esters, amides, ureas, nitriles, sulfides, polyether polyols and combinations thereof. In alternative embodiments the complexing agent may include, without limitation, a water-soluble aliphatic alcohol selected from ethanol, isopropyl alcohol, n-butyl alcohol, isobutyl alcohol, sec-butyl alcohol, and tert-butyl alcohol, and tert-butyl alcohol (t-butanol) may be preferred in certain applications. In another embodiment, the selected complexing agent may be an ether, such as glyme (dimethoxyethane) or diglyme. In one conventional preparation, aqueous solutions of zinc chloride (in excess amount) and potassium hexacyanocobaltate may be combined by simple mixing. The resulting precipitate of zinc hexacyanocobaltate is then mixed with aqueous glyme. The active DMC catalyst obtained has the formula:

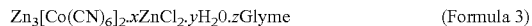

$$Zn_3[Co(CN)_6]_2 \cdot xZnCl_2 \cdot yH_2O \cdot zGlyme \quad \text{(Formula 3)}$$

DMC compounds prepared in the absence of a complexing agent are highly crystalline, as shown by X-ray diffraction analysis, and may be, along with the highly crystalline DMC compounds prepared with a complexing agent, useful in the process of the present invention. Some researchers have shown that conventional DMC catalysts include both crystalline and amorphous components. Typically, these DMC catalysts, which are generally prepared by simple mixing, still contain at least 35 weight percent of highly crystalline DMC compound. However, there are some conventional DMC compounds, useful herein, which contain less than 30 weight percent of the highly crystalline component. These may be prepared by a method wherein aqueous solutions of a water-soluble metal salt and a water-soluble metal cyanide salt are intimately combined in the presence of the complexing agent, such as is disclosed in U.S. Pat. No. 5,731,407, which is incorporated herein by reference in its entirety.

Examples of DMC compounds useful herein may include zinc hexacyano-cobaltate(III), zinc hexacyanoferrate(III), zinc hexacyanoferrate(III)zinc hexacyanoferrate(II), nickel (II) hexacyanoferrate(II), cobalt(II) hexacyano-cobaltate (III), and the like. In certain embodiments, it may be particularly desirable to use zinc hexacyanocobaltate(III). Further examples are listed in U.S. Pat. No. 5,158,922, which is incorporated herein by reference in its entirety.

In some embodiments, a solid DMC catalyst may include from 5 to 80 weight percent, based on the total amount of catalyst, of a polyether. For example, it may be desirable to include from 10 to 70 weight percent of the polyether. In other embodiments it may be desirable to include from 15 to 60 weight percent of the polyether.

Thus, a DMC catalyst that is useful in the inventive process may be fully described, in some embodiments, by the following formula:

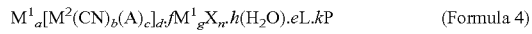

$$M^1_a[M^2(CN)_b(A)_c]_d \cdot fM^1_g X_n \cdot h(H_2O) \cdot eL \cdot kP \quad \text{(Formula 4)}$$

wherein
- $M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{3+}$, $Rh^{3+}$, $Ru^{2+}$, and $Ru^{3+}$;
- $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, and $Ir^{3+}$;
- A and X are each, independently of one another, an anion selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate and hydrogencarbonate;
- L is a water-miscible ligand selected from the group consisting of alcohols, aldehydes, ketones, ethers, polyethers, esters, polyesters, polycarbonate, ureas, amides, primary, secondary and tertiary amines, ligands having a pyridine nitrogen, nitriles, sulfides, phosphides, phosphites, phosphanes, phosphonates and phosphates;
- k is a fraction or integer greater than or equal to zero;
- P is an organic additive;
- a, b, c, d, g and n are selected such that the compound of Formula 4 is electrically neutral, with c being able to be 0;
- e is the number of ligand molecules and is a fraction or integer equal to or greater than 0; and
- f and h are each, independently of one another, a fraction or integer equal to or greater than 0.

Examples of an organic additive P may include, without limitation, polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-comaleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, bile acids or their salts, esters or amides, carboxylic esters of polyhydric alcohols and glycosides. Additional examples of certain DMC catalysts and their preparation may be found in, for example, U.S. Pat. Nos. 3,427,334; 3,941,849; 4,477,589; 5,158,922; 5,470,813; 5,482,908; and 7,348,460, which are incorporated herein by reference in their entireties.

In a second embodiment of the inventive process, the first two steps are reversed. This means that, in this second embodiment, step 1 is a transesterification step, wherein the starting hydroxylated fatty acid or corresponding hydroxylated fatty ester is transesterified to form an ester therefrom. Step 2 is partial oligomerization of the ester to form an oligomerized ester. Finally, step 3 is capping using an alkylene oxide, which ultimately results in formation of the desired oligomerized ester alkoxylate composition. Each of the steps may include the optional catalysts and the conditions described with respect to each type of step in the first embodiment of the invention, as detailed hereinabove.

Thus, the first embodiment has a reaction progression that may be illustrated by the following formulaic representation:

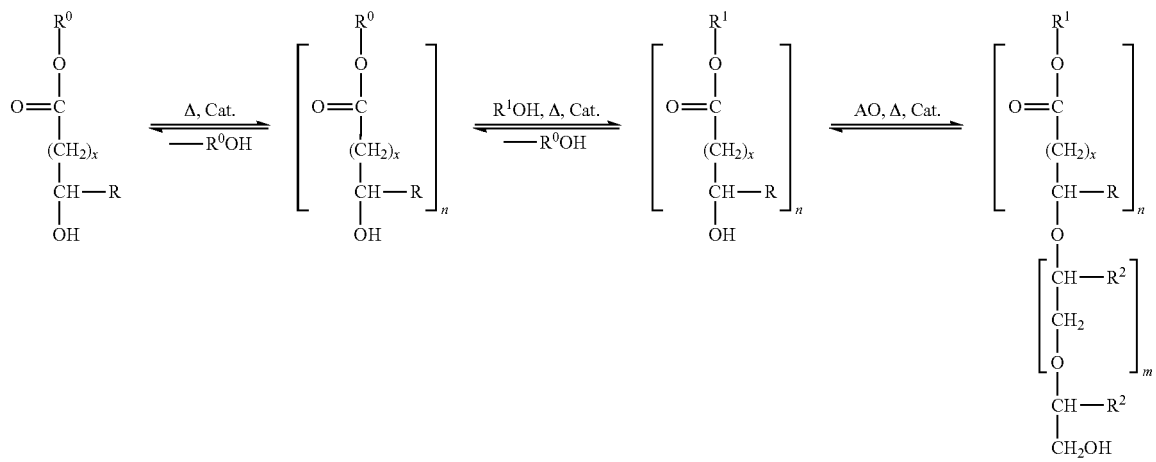

wherein $R^0$ is hydrogen or a methyl radical, n is an integer greater than or equal to 1, m is an integer greater than or equal to 0, x is an integer from 8 to 12, preferably 10; R is a substituent having a carbon atom number from 2 to 10, preferably 6; $R^1$ is a substituent having a carbon atom number from 2 to 22, preferably 4 to 18, more preferably from 6 to 14, and most preferably from 8 to 10; and $R^2$ is hydrogen or a substituent having a carbon atom number from 1 to 22, preferably H or from 1 to 18, more preferably H or from 1 to 4, and most preferably H or from 1 to 2.

The second embodiment may be represented by the following formulaic representation:

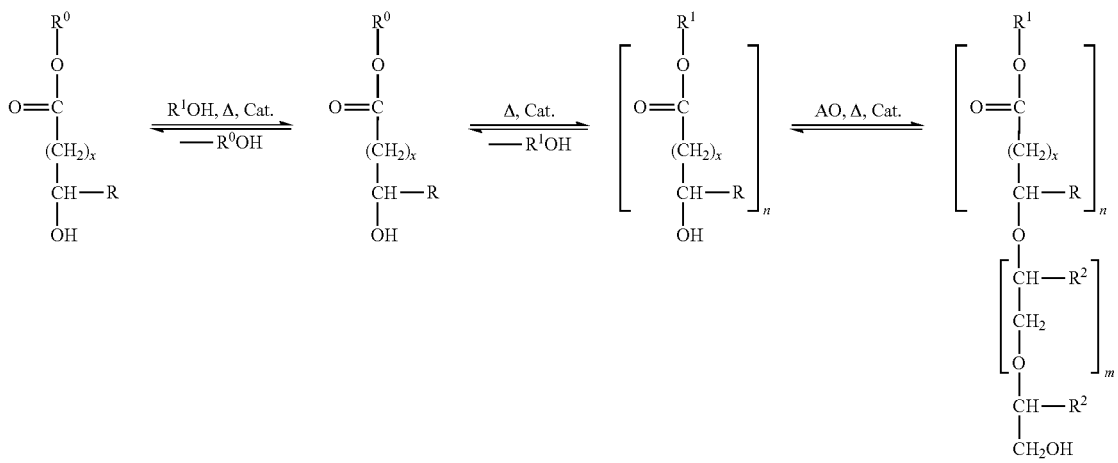

wherein $R^0$, m, n, x, R, $R^1$ and $R^2$ are as defined hereinabove.

It has been surprisingly found that the inventive oligomerized ester alkoxylate compositions, prepared according to the inventive process, may have particularly desirable physical properties. Some of these properties may exhibit improvements that may be imputed to the fact that, where a double metal cyanide complex is used for the step 3 alkoxylation, the occurrence of unwanted by-products is reduced or eliminated. This includes a reduction in the occurrence of unsaturated products. Such improved properties may further include, but are not limited to, a desirably high viscosity index, preferably greater than or equal to 150, and a desirably low pour point that is preferably less than or equal 0° C. Other properties, such as thermo-oxidative stability (measured according to ASTM D2893) and renewable carbons (measured according to ASTM D6866-08), may also be found to be at desirable levels, depending upon a specific application goal, for example, preferably greater than or equal to 1 percent by weight, more preferably greater than or equal to 25 percent by weight, and still more preferably greater than or equal to 50 percent by weight. The American Society for Testing Materials (ASTM) standards used to obtain some of the mentioned measurements are designated in Table 1 hereinbelow.

The inventive oligomerized ester alkoxylate compositions may find use as lubricants, heat transfer fluids, plasticizers, thickening agents, surfactants, or power transmission fluids. They may also be useful as isocyanate-reactive materials for the preparation of polyurethane materials and articles. These articles may include foams, elastomers, coatings and adhesives.

EXAMPLES

Examples 1-4

Step 1: To a glass reactor equipped with a temperature controller, overhead stirrer and Dean-Stark apparatus, an amount of methyl-12-hydroxy-stearate (5748.3 grams (g)), a nonane fraction (188.8 g) and tin(II)-2-ethylhexanoate (18.76 g) is charged. The mixture is then heated to 190° C. for a period of 16 h, while at intervals more nonane fraction is added (482.8 g), removing the formed methanol by azeotropic distillation with nonane. The residual nonane fraction is distilled under reduced pressure (approximately (ca) 30 mbar (3 kPa)) at 160° C. The reactor is then cooled to 120° C.

Step 2: A Vigreux distillation column is placed between the reactor and the Dean-Stark apparatus, and then the product of step 1 (4983.51 g), 2-ethylhexanol (2,212.80 g), and tin(II)-2-ethylhexanoate (15.91 g) are added and the mixture heated to 190° C. for a period of 25 h, removing formed methanol by fractional distillation. Excess 2-ethylhexanol is removed by distillation under reduced pressure at 160° C. The reactor is then cooled to 100° C. The mixture is filtered using a Whatman micro glassfiber filter coated with 0.34 g/cm² of magnesium silicate.

Step 3: The product of step 2 (1,526.60 g) is then placed in a pressure resistant stainless steel reactor equipped with an overhead stirrer, pressure gauge, and a propylene oxide (PO) feeding bomb. The material is heated to 40° C. and phosphoric acid ($H_3PO_4$, 85%) (0.040 g) is added. The mixture is heated to 100° C. under vacuum for 1 h and 15 minutes (min) before a double metal cyanide complex catalyst, designated as ARCOL™ A3 (0.1089 g), is added. After sparging the reactor with nitrogen, the mixture is heated to 120° C. The catalyst is activated with 8% weight/weight (w/w) of PO (122.10 g) and allowed to react until the pressure in the reactor returns to its pre-PO addition level (ca 1 bar, 100 kPa).

After activation occurs, PO (276.6 g) is fed at a rate of 900 grams per hour (g/h) into the reactor and allowed to react until the pressure returns to the pressure before the addition. A sample is then taken, butylhydroxytoluene (ca 500 parts per million (ppm)) is added, and the product is labeled as Example 1 (415.40 g).

To the remaining material, PO (416.9 g) is added and allowed to react until the pressure returns to its pre-PO addition level. A sample is taken and butylhydroxytoluene (ca 500 ppm) is added to it. This product is labeled as Example 2 (444.70 g).

Again, to the remaining material, PO (641.30 g) is added and allowed to react until the pressure returns to its pre-PO addition level. A sample is taken and butylhydroxytoluene (ca 500 ppm) is added to it. This product is labeled as Example 3 (819.0 g).

Again, to the remaining material, PO (246.2 g) is added and allowed to react until the pressure returns to its pre-PO addition level. A sample is taken and butylhydroxytoluene (ca 500 ppm) is added to it. This product is labeled as Example 4 (1550.6 g).

TABLE 1

|  | Step 1 | Step 2 | Example 1 | Example 2 | Example 3 | Example 4 |
|---|---|---|---|---|---|---|
| [1]Degree of Oligomerization | 1.97 | 1.90 | 1.9 | 1.9 | 1.9 | 1.9 |
| [2]Viscosity* at 40° C. (cSt) | 91.5* | 78.2* | 95.6 | 116 | 154 | 186 |
| [2]Viscosity* at 100° C. (cSt) | 15* | 10.8* | 14.5 | 18 | 23.9 | 28.9 |
| [3]Viscosity Index | N/A | 126 | 157 | 173 | 187 | 196 |
| [4]Pour Point (° C.) | na | +13 | −3 | −12 | −18 | −21 |
| [5]Total Acid Number (AV) (mg KOH/g) | 0.3 | 0.10 | 0.15 | 0.12 | 0.08 | 0.13 |
| [6]Water (wt %) | 0.02 | 0.009 | 0.024 | 0.043 | 0.017 | 0.022 |
| [7]OH # (mg KOH/g) | 95.6 | 84.2 | 64.5 | 50.2 | 35.3 | 29.7 |

[1]Degree of oligomerizaton: Repeating 12-hydroxystearoyl units (based on OH# derived MW's)
[2]Viscosity: ASTM D445-94
[3]Viscosity Index: ASTM D4274-94d
[4]Pour Point: ASTM D97
[5]Total Acid Number: ASTM D4662
[6]Water: ASTM E203
[7]OH #: ASTM D4274
*Viscosity measured via cone/plate method ISO 3219
N/A not applicable
na not analyzed Examples 5-8

Step 1: The procedure of Examples 1-4, step 1, is followed, except that the following amounts of reactants are used: Methyl-12-hydroxy-stearate (5,298.2 g); nonane fraction (793.4 g); and tin(II)-2-ethylhexanoate (15.9 g). Heating is for a period of 52 h, but additional nonane fraction is not added.

Step 2: The procedure of Examples 1-4, step 2, is followed, except that the following amounts of reactants are used: Product of step 1 (3141.3 g); 2-ethylhexanol (733.7 g); and tin(II)-2-ethylhexanoate (9.98 g). The heating is for a period of 25 h. The filter coating is 0.34 g/cm² of magnesium silicate.

Step 3: The procedure of Examples 1-4, step 3, is followed, except that the following amounts of reactants are used: Product of step 2 (1427.7 g); $H_3PO_4$ (85%) (0.018 g); and ARCOL™ A3 (0.1018 g). Heating is to 75° C. under vacuum for 1 h and 20 min. The catalyst is activated with 6% w/w of PO (86.4 g).

After activation has occurred, PO (108.3 g) is fed into the reactor and allowed to react until the pressure returns to the pressure before the addition. A sample is then taken, butylhydroxytoluene (ca 500 ppm) is added and the product is labeled as Example 5 (400.32 g).

To the remaining material, PO (194.9 g) is added and allowed to react until the pressure returns to its original value. A sample is taken and butylhydroxytoluene (ca 500 ppm) is added to it. This product is labeled as Example 6 (426.0 g).

Again, to the remaining material, PO (272.7 g) is added and allowed to react until the pressure returns to its original value. A sample is taken and butylhydroxytoluene (ca 500 ppm) is added to it. This product is labeled as Example 7 (591.3 g).

Again, to the remaining material, PO (90.8 g) is added and allowed to react until the pressure returns to its original value. A sample is taken and butylhydroxytoluene (ca 500 ppm) is added to it. This product is labeled as Example 8 (764.7 g).

TABLE 2

|  | Step 1 | Step 2 | Example 5 | Example 6 | Example 7 | Example 8 |
|---|---|---|---|---|---|---|
| [1]Degree of Oligomerization | 4.49 | 4.08 | 4.08 | 4.08 | 4.08 | 4.08 |
| [2]Viscosity* at 40° C. (cSt) | 231* | 139* | 161 | 184 | 226 | 264 |
| [2]Viscosity* at 100° C. (cSt) | 29.3* | 19.1* | 22.6 | 26.5 | 32.9 | 38.9 |
| [3]Viscosity Index | N/A | 156 | 168 | 180 | 191 | 201 |
| [4]Pour Point (° C.) | na | −6 | −9 | −12 | −15 | −18 |
| [5]Total Acid Number (AV) (mg KOH/g) | 0.17 | 0.54 | 0.16 | 0.16 | 0.59 | 0.79 |
| [6]Water (wt %) | 0.02 | 0.07 | 0.02 | 0.01 | 0.02 | 0.03 |
| [7]OH # (mg KOH/g) | 43.2 | 43.8 | 38 | 32.5 | 25.8 | 22.4 |

[1]Degree of oligomerizaton: Repeating 12-hydroxystearoyl units (based on OH# derived MW's)
[2]Viscosity: ASTM D445-94
[3]Viscosity Index: ASTM D4274-94d
[4]Pour Point: ASTM D97
[5]Total Acid Number: ASTM D4662
[6]Water: ASTM E203
[7]OH #: ASTM D4274
*Viscosity measured via cone/plate method ISO 3219
N/A not applicable
na not analyzed

Examples 9-12

Steps 1 and 2 (combined): The procedure of Examples 1-4, step 1, is followed, except that the following amounts of reactants are used: Methyl-12-hydroxy-stearate (2921.8 g); tin(II)-2-ethylhexanoate (18.7 g); and 2-ethylhexanol (2363.2 g). Heating is for a period of 21 h. The filter coating is 0.28 g/cm² of magnesium silicate.

Step 3: The product of steps 1 and 2 (combined) (1084.7 g) is then placed in a pressure resistant steel reactor equipped with an overhead stirrer, pressure gauge, and a propylene oxide feeding bomb. After sparging the reactor with $N_2$ the mixture is heated to 75° C. under vacuum for 2 h. The mixture is brought to atmospheric pressure with $N_2$ and $H_3PO_4$ (85%) (0.05 g) and ARCOL™ A3 (0.0855 g) is added. Again, after sparging the reactor with $N_2$ the mixture is heated to 75° C. under vacuum for 15 min. Next the mixture is brought to atmospheric pressure with $N_2$ and heated to 120° C. The catalyst is activated with 6% w/w of PO (65.6 g) and allowed to react until the pressure in the reactor returns to the pressure before the addition of the PO (ca 1 bar, 100 kPa).

After activation has occurred, PO (324.7 g) is fed into the reactor and allowed to react until the pressure returns to the pressure before the addition. A sample is then taken, butylhydroxytoluene (ca 500 ppm) is added and the product is labeled as Example 9 (278.6 g).

To the remaining material, PO (422.6 g) is added and allowed to react until the pressure returns to its original value. A sample is taken and butylhydroxytoluene (ca 500 ppm) is added to it. This product is labeled as Example 10 (395.9 g).

Again, to the remaining material, PO (637.9 g) is added and allowed to react until the pressure returns to its original value. A sample is taken and butylhydroxytoluene (ca 500 ppm) is added to it. This product is labeled as Example 11 (895.3 g).

Again, to the remaining material, PO (212.1 g) is added and allowed to react until the pressure returns to its original value. A sample is taken and butylhydroxytoluene (ca 500 ppm) is added to it. This product is labeled as Example 12 (1177.8 g).

Comparative Examples A-D

The procedure of Examples 1-4, step 1, is followed, except that the following amounts of reactants are used: Methyl-12-hydroxy-stearate (5,298.2 g); nonane fraction (793.4 g); and tin(II)-2-ethylhexanoate (15.9 g). Heating is for a period of 52 h. The mixture is filtered using a Whatman micro glassfiber filter coated with 0.34 g/cm² of magnesium silicate. No transesterification step is undertaken.

The filtrate product (1067.8 g) is then placed in a pressure resistant steel reactor equipped with an overhead stirrer, pressure gauge, and a propylene oxide feeding bomb. After sparging the reactor with $N_2$ the mixture is heated to 100° C. under vacuum for 1.5 h. The mixture is brought to atmospheric pressure with $N_2$ and $H_3PO_4$ (85%) (0.025 g) and ARCOL™ A3 (0.0808 g) is added. Again, after sparging the reactor with $N_2$ the mixture is heated to 100° C. under vacuum for 15 min. Next, the mixture is brought to atmospheric pressure with $N_2$ and heated to 120° C. The catalyst is activated with 6% w/w of PO (64.1 g) and allowed to react until the pressure in the reactor returns to the pressure before the addition of the PO (ca 1 bar, 100 kPa).

After activation has occurred, PO (101.5 g) is fed into the reactor and allowed to react until the pressure returns to the pressure before the addition. A sample is then taken, butylhydroxytoluene (ca 500 ppm) is added, and the product is labeled as Comparative Example A (285.9 g).

To the remaining material, PO (169.6 g) is added and allowed to react until the pressure returns to its original value. A sample is taken and butylhydroxytoluene (ca 500 ppm) is added to it. This product is labeled as Comparative Example B (217.7 g).

Again, to the remaining material, PO (136.6 g) is added and allowed to react until the pressure returns to its original value. A sample is taken and butylhydroxytoluene (ca 500 ppm) is added to it. This product is labeled as Comparative Example C (296.5 g).

TABLE 3

|  | Step 1 | Example 9 | Example 10 | Example 11 | Example 12 |
|---|---|---|---|---|---|
| [1]Degree of Oligomerization | 1.25 | 1.25 | 1.25 | 1.25 | 1.25 |
| [2]Viscosity* at 40° C. (cSt) | 31.0* | 49.3 | 66 | 99 | 131 |
| [2]Viscosity* at 100° C. (cSt) | 5.12* | 8.7 | 11.5 | 16.8 | 21.9 |
| [3]Viscosity Index | N/A | 156 | 170 | 185 | 196 |
| [4]Pour Point (° C.) | +23 | +6 | na | −15 | −15 |
| [5]Total Acid Number (AV) (mg KOH/g) | 0.20 | 0.08 | 0.08 | 0.09 | 0.09 |
| [6]Water (wt %) | 0.05 | 0.02 | 0.01 | 0.01 | 0.01 |
| [7]OH # (mg KOH/g) | 116.0 | 81.9 | 59.6 | 41.4 | 32.6 |

[1]Degree of oligomerization: Repeating 12-hydroxystearoyl units (based on OH# derived MW's)
[2]Viscosity: ASTM D445-94
[3]Viscosity Index: ASTM D4274-94d
[4]Pour Point: ASTM D97
[5]Total Acid Number: ASTM D4662
[6]Water: ASTM E203
[7]OH #: ASTM D4274
*Viscosity measured via cone/plate method ISO 3219
N/A not applicable
na not analyzed Again, to the remaining material, PO (97.5 g) is added and allowed to react until the pressure returns to its original value. A sample is taken and butylhydroxytoluene (ca 500 ppm) is added to it. This product is labeled as Comparative Example D (837.0 g).

TABLE 4

|  | Step 1 | Comparative Example A | Comparative Example B | Comparative Example C | Comparative Example D |
|---|---|---|---|---|---|
| [1]Degree of Oligomerization | 4.41 | 4.41 | 4.41 | 4.41 | 4.41 |
| [2]Viscosity* at 40° C. (cSt) | 230 | 249 | 264 | 292 | 336 |
| [2]Viscosity* at 100° C. (cSt) | 29.1 | 32.9 | 35.8 | 40.4 | 46.8 |
| [3]Viscosity Index | N/A | 177 | 185 | 193 | 200 |
| [4]Pour Point (° C.) | na | −2 | −6 | −9 | −9 |
| [5]Total Acid Number (AV) (mg KOH/g) | 0.18 | 0.15 | 0.21 | 0.14 | 0.11 |
| [6]Water (wt %) | 0.02 | 0.02 | 0.008 | 0.012 | 0.019 |
| [7]OH # (mg KOH/g) | 43.9 | 34.0 | 28.1 | 23.8 | 20.7 |

[1]Degree of oligomerization: Repeating 12-hydroxystearoyl units (based on OH# derived MW's)
[2]Viscosity: ASTM D445-94
[3]Viscosity Index: ASTM D4274-94d
[4]Pour Point: ASTM D97
[5]Total Acid Number: ASTM D4662
[6]Water: ASTM E203
[7]OH #: ASTM D4274
*Viscosity measured via cone/plate method ISO 3219
N/A not applicable
na not analyzed

What is claimed is:

1. A process to prepare an oligomerized ester alkoxylate comprising
preparing an oligomerized ester by either
(a) partially oligomerizing 12-hydroxy stearic acid or 12-hydroxy stearic acid methyl ester such that less than 99 mole percent of the carboxylic acid groups or ester groups is reacted to form a product including an oligomer of the hydroxylated fatty acid or the hydroxylated fatty ester having unreacted carboxylic acid groups or ester groups; and quantitatively reacting the unreacted carboxylic acid groups or ester groups with an alcohol having from 2 to 22 carbon atoms; optionally removing any excess alcohol; to form a product including an oligomerized ester of the hydroxylated fatty acid or of the hydroxylated fatty ester;
or
(b) quantitatively reacting 12-hydroxy stearic acid or 12-hydroxy stearic acid methyl ester with an alcohol having from 2 to 22 carbon atoms; optionally removing any excess alcohol; to form a product including an ester of the 12-hydroxy stearic acid or 12-hydroxy stearic acid methyl ester; and partially oligomerizing the produced ester such that less than 99 mole percent of the carboxylic acid groups or ester groups is reacted to form a product including an oligomerized ester of 12-hydroxy stearic acid or 12-hydroxy stearic acid methyl ester; and
reacting the oligomerized ester with an alkylene oxide, in the presence of a double metal cyanide catalyst, under conditions such that an oligomerized ester alkoxylate is formed.

2. The process of claim 1 wherein, in the partial oligomerization, from 10 to 90 mole percent of the carboxylic acid groups or esters groups of the 12-hydroxy stearic acid or 12-hydroxy stearic acid methyl ester is reacted to form a product including an oligomerized ester of the 12-hydroxy stearic acid or 12-hydroxy stearic acid methyl ester.

3. The process of claim 2 wherein, in the partial oligomerization, from 20 to 80 mole percent of the carboxylic acid groups or esters groups is reacted to form a product including an oligomerized ester of the hydroxylated fatty acid or of the hydroxylated fatty ester.

4. The process of claim 1 wherein the partial oligomerization is carried out at a temperature ranging from 70 to 220° C.

5. The process of claim 1 wherein the amount of the alcohol ranges from 1 to 4 equivalents, based on the functionality of the unreacted hydroxylated fatty acid or fatty ester.

6. An oligomerized ester alkoxylate composition prepared by a the process of claim 1.

7. The composition of claim 6 wherein the composition exhibits at least one property selected from a viscosity index greater than or equal to 150 ASTM D4274-94d; a pour point less than or equal to 0° C., according to ASTM D97; a renewable carbon level greater than or equal to 1 percent by weight, according to ASTM D6866-08; or a combination thereof.

8. The composition of claim 7 wherein the renewable carbon level is greater than or equal to 50 percent by weight, according to ASTM D6866-08.

* * * * *